Jan. 24, 1950 E. D. FROST 2,495,411
SYNCHROMESH CHANGE-SPEED GEARING

Filed Sept. 7, 1945 2 Sheets-Sheet 1

Inventor
Edgar D. Frost
by Mawhinney & Mawhinney
Attorneys

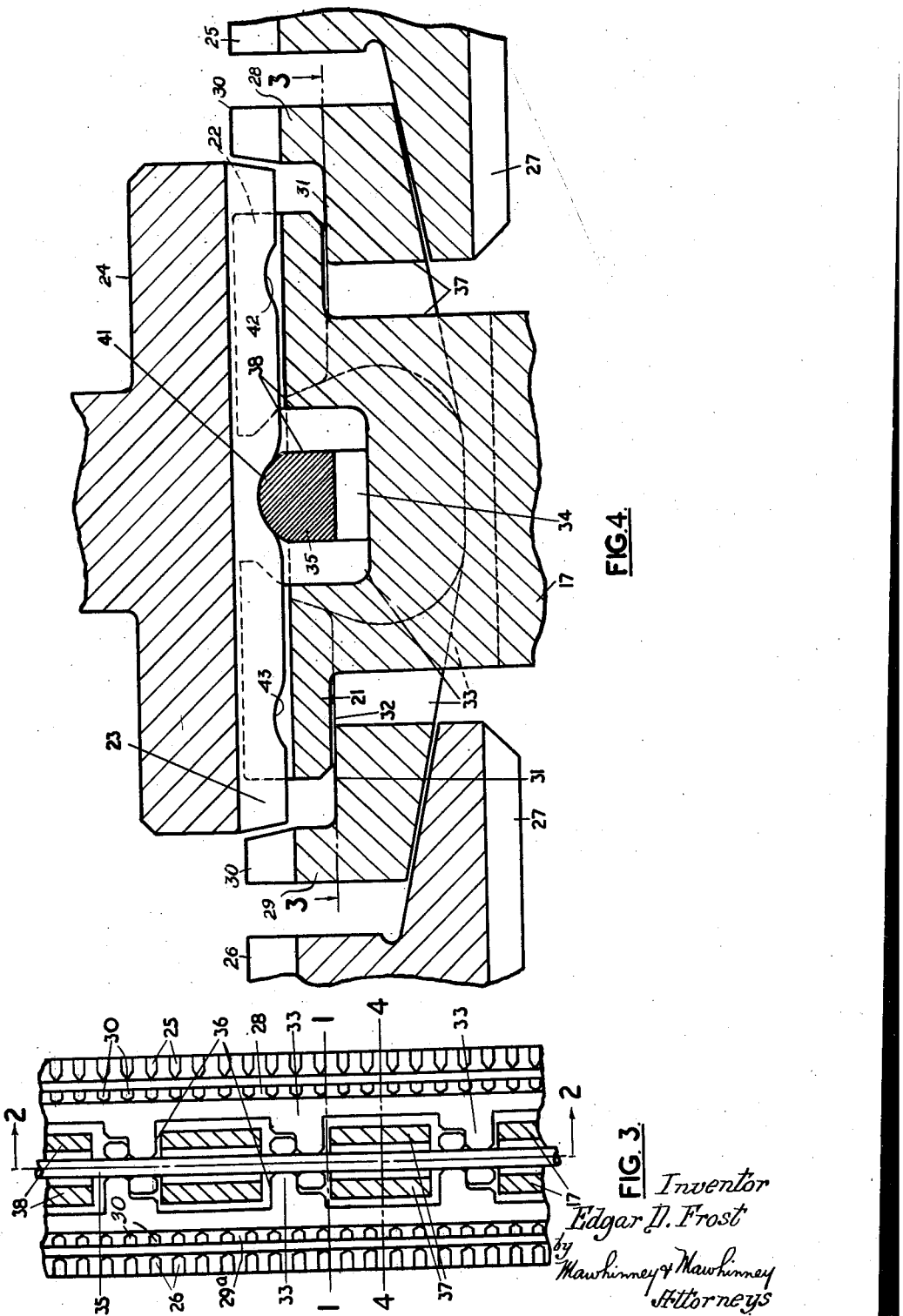

Patented Jan. 24, 1950

2,495,411

UNITED STATES PATENT OFFICE 2,495,411

SYNCHROMESH CHANGE-SPEED GEARING

Edgar David Frost, Coventry, England, assignor to Humber Limited, Stoke, Coventry, England Application September 7, 1945, Serial No. 614,842
In Great Britain September 16, 1944

4 Claims. (Cl. 192—53)

This invention relates to synchro-mesh change-speed gearing, of the kind having a double-acting, slidable, positive clutch element, in the form of a collar, which has to pass a masking or baulking ring (in whichever direction it is moved) to mesh, when synchronism is reached, with the coacting positive clutch element, the appropriate baulking ring having a frictional surface which is forced axially into frictional engagement with a frictional surface of the associated positive clutch element, to produce synchronism, by axial movement of the collar, the baulking rings having a driving engagement, providing slight angular clearance, with a hub member upon which the collar is non-rotatably mounted and which is axially fast.

Usually in such a synchro-mesh device each baulking ring has external teeth between which the teeth on the collar can pass, when synchronism has been reached; and each baulking ring is formed with a female cone surface adapted frictionally to engage a male cone surface (the two male cone surfaces being fast either with a driving shaft and a driven gear, respectively, as is illustrated in the accompanying drawings, or with two driven gears, respectively) with which the said hub member is to be inter-meshed by the collar.

As wear of the frictional surfaces takes place, unsatisfactory operation tends to result. One of my objects is to provide a very definite frictional pressure with which synchronism will be speeded up, resulting in less wear occurring at the frictional surfaces, whereby the life of the device will be increased. Another object is to facilitate production of the device, and to distribute the load through which the frictional engagement takes place at a large number of points. Another object is to ensure that there shall be no frictional drag between the pairs of frictional surfaces when not engaged in effecting synchronism.

According to the invention each of the baulking rings is tied at a number of points (so that there will be substantially no clearance or lost motion in an axial direction) to an outwardly-springing ring adapted to engage an internal peripheral groove in the collar, the spring ring serving, on the initial movement of the collar in either axial direction, for forcing the selected baulking ring at each of the tying points into frictional engagement with the frictional surface of the associated positive clutch element, while the other baulking ring is being positively withdrawn, still further from its coacting frictional surface. There may, for example, be six angularly-spaced tying points.

Thus, in carrying out the invention, each baulking ring, in the form of a female cone with external radial masking teeth to coact with the teeth of the slidable collar, may be formed with six circumferentially-spaced, laterally-extending arms, the ends of which are forked in a radial direction to jointly provide an external annular groove to receive the spring ring, preferably with substantially no lateral clearance (i. e., in an axial direction of the ring); but, naturally, the forks provide radial clearance to allow of the ring being depressed into the groove of the fork limbs when the collar is moved axially through the teeth of either baulking ring. The lateral arms from the two baulking rings are preferably grouped together in pairs in slots, in the hub member, which provide the angular clearance above-mentioned, and the spring ring has the necessary working clearance in the hub member.

In the accompanying drawings:

Figure 3 is a fragmentary, developed, part-sectional elevational view with the sliding positive clutch collar omitted, the hub member being in section taken mainly on the line 3—3 of Figure 4; and Figure 4 is a fragmentary view, to a larger scale, corresponding to Figure 1, of the upper portion of the device, but the section in this case is taken mainly on the line 4—4 of Figure 2 or Figure 3.

Figure 2:
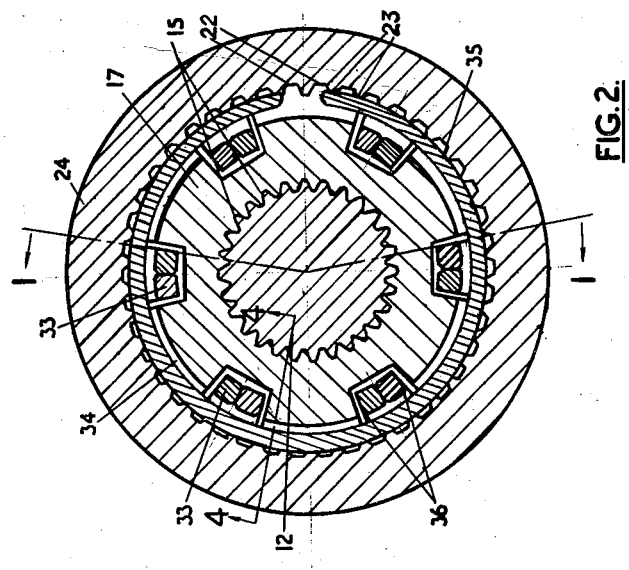
Figure 2 is a cross-section thereof taken on the line 2—2 of Figure 1 or of Figure 3.

The drawings show a driven shaft 12 with a gear 13 fast thereon and driving gear 14 rotatively mounted through a bearing 15 on a reduced portion thereof. Between the two gears 13 and 14, the shaft has a serrated portion 16 upon which is fitted a hub member 17, being located thereon by means of a nut 18 on one side and a washer 19 interposed between the hub member and the gear 13, which latter is thereby held against a collar 20 on the shaft. In this way the hub member 17 is fixed upon the shaft. As in ordinary gearing of this kind, the gears 13 and 14 are permanently interconnected by gears on a layshaft, in a known manner which it is not believed necessary to illustrate.

As shown most clearly by Figure 4 the radially outer end of the hub is enlarged at 21 in an axial direction, and the enlarged portion is provided with external splines 22 which slidingly engage with internal splines 23 of a slidable collar 24 constituting the double-acting, slidable, positive clutch element.

The coacting axially-stationary positive clutch elements are respectively a ring of teeth 25, fast with the gear 13, and a ring of teeth 26, fast with the gear 14, these toothed rings being internally splined, as shown at 27, and drivingly engaged with corresponding splines on hub portions of the two gears. The hub of each positive clutch element, 25, 26, is formed with a frictional male cone surface with which coacts a corresponding female cone surface on a masking or baulking ring 28, 29. Each baulking ring has external teeth 30 which in certain angular positions of the baulking ring (when synchronism is reached) are aligned with the dog clutch teeth 25 and 26, respectively. As shown by Figure 3, the axial inner edges of the teeth 30 and of the teeth 25, 26 are bevelled to coact with the ends of the internal splines 23 of the slidable collar 24. As shown by Figure 4 particularly, the baulking rings have machined faces 31 to slidably engage with the inner peripheries 32 of the enlarged outer portion 21 of the hub member 17, whereby they are slidingly supported by the hub member.

Figure 1:
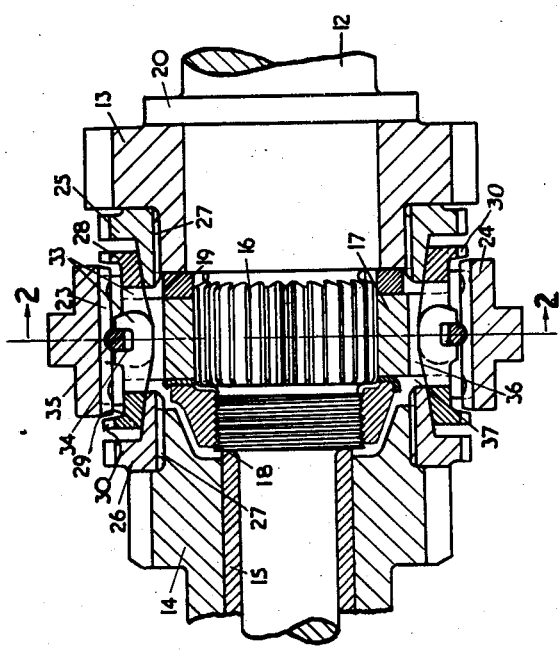
Figure 1 is a longitudinal section through one form of synchro-mesh device according to the invention, taken mainly on the line 1—1 of Figure 2 or of Figure 3.

In the present instance, each of the baulking rings 28, 29 is formed with a number of circumferentially-spaced lateral arms 33 the ends of which are forked in a radial direction, as shown most clearly by Figure 1, the forked limbs being aligned with one another to jointly provide an annular groove 34. With this groove coacts an outwardly-springing ring 35 which has substantially no clearance (in the groove) in an axial direction but which has radial clearance, as shown, to enable the ring to be depressed further into the groove.

The drawings show each baulking ring as having six lateral arms 33 grouped together in pairs. Each pair of arms extend into a slot 36 in the hub member 17, as shown by Figures 1 and 2, with substantial clearance in a circumferential direction, as shown at 36 in Figures 2 and 3, and this enables the baulking rings to move relatively to the hub member to a predetermined extent in a circumferential direction. The baulking rings also have working clearance from the hub member 17 on opposite sides thereof, as indicated at 37, and, between adjacent pairs of the arms 33, the hub member is peripherally slotted to receive the spring ring 35 with similar working clearance in an axial direction, as indicated at 38.

Internally of the slidable collar 24 are peripheral grooves 41, 42 and 43 (see Figure 4) adapted in different positions of the collar to coact with the spring ring 35.

The operation of this device is as follows:

Figure 4 shows the collar in the neutral position in which the spring ring 35 is engaged with the peripheral groove 41, and there is clearance at all the male and female cone surfaces. Initial movement of the collar 24 to the right (Figures 1 and 4) will, through the engagement therewith of the spring ring 35, move both baulking rings to the right, thereby increasing the clearance of the baulking ring 29 from the associated male cone surface and forcing the baulking ring 28 into engagement with the male cone surface of the positive clutch element 25. This tends to cause synchronism to take place between the hub member 24 (i. e., between the shaft 12) and the clutch element 25 (i. e., the gear 13). Until synchronism is reached the drag of the frictional engagement holds the associated masking teeth 30 in the way of the ends of the associated internal splines 23 on the slidable collar. When synchronism is reached the splines of the slidable collar can pass through the masking teeth into engagement with the teeth of the clutch element 25, thereby clutching the gear 13 to the shaft 12 and providing an indirect drive to the shaft 12 through the layshaft above-mentioned. In these conditions the spring ring 35, which has been forced radially inwardly during the final movement of the slidable collar, springs out to the groove 43, whereby to bias the slidable collar to remain in this position.

In a substantially similar manner, movement of the slidable collar 24 from this position fully to the left will first move both baulking rings to the left with a substantial pressure, while the spring ring 35 is being forced out of the groove 43, later to re-engage with the groove 41. At this time, the baulking ring 28 is quite clear of frictional contact with the clutch element 25, and the baulking ring 29 is frictionally engaged with the clutch element 26, thereby attempting to effect synchronism of the gear 14 and the shaft 12. When synchronism between these two members is reached the final movement of the slidable collar 24 to the left can take place until the spring ring 35, after having been again depressed, enters the peripheral groove 42 to maintain the parts in this position (in which the shaft 12 is directly driven) until the collar is again moved.

Such an arrangement ensures that neither baulking ring will be frictionally engaged with its associated member except while it is inducing synchronism or when synchronism has been induced and in other conditions there is a complete absence of frictional drag—which, of course, enables the baulking rings and the associated surfaces to have a long life without material wear taking place. A high thrust can be obtained with a relatively low pressure of the spring ring 35, which in addition to ensuring the requisite movement of the baulking rings serves as an axial lock.

It will be apparent that a spring ring of this character involves less production expense than the use of spring-pressed balls such as are commonly used in a synchro-mesh device of the kind specified in the first paragraph hereof.

What I claim as my invention and desire to secure by Letters Patent of the United States is:

1. A synchro-mesh change-speed gearing of the kind specified, including a double-acting slidable positive clutch collar, a laterally-rigid outwardly-springing ring adapted to be engaged with and disengaged from an internal peripheral groove of the collar, baulking rings, and means respectively fast with each of the baulking rings for tying said baulking rings at a number of points to the outwardly-springing ring whereby the latter is always tied to said baulking rings so that there will be substantially no clearance or lost-motion between them in an axial direction, the spring ring serving, on the initial movement of the collar in either direction, for forcing the selected baulking ring at each of the tying points into frictional synchronising engagement and also for positively withdrawing the other baulking ring still further from its coacting element.

2. A synchro-mesh change-speed gearing of the kind specified, including a double-acting slidable positive clutch collar having an internal peripheral groove, a laterally rigid outwardly-springing ring adapted to be engaged with the groove in certain axial positions of the collar and to be disengaged therefrom in other axial positions thereof, and baulking rings each provided with laterally-extending arms the ends of which are forked in a radial direction to jointly provide in effect an external annular groove to receive the spring-ring with radial clearance and to thus at all times retain it, but to receive it with substantially no clearance in an axial direction, whereby movement of either baulking ring in the direction for effecting frictional synchronizing engagement positively moves the other baulking ring still further from its coacting element through the intermediary of the said spring-ring.

3. A synchro-mesh change-speed gearing of the kind specified, including a double-acting slidable positive clutch collar having an internal peripheral groove, an outwardly-springing ring adapted to coact with the groove, said collar having internal splines formed therein, an axially-fast hub member of which the radially-outer portion is axially enlarged, external splines formed on said axially-enlarged portion of the hub member slidably coacting with the internal splines of said collar, and baulking rings spaced on opposite sides of said member and slidably supported by the inner peripheries of said axially-enlarged portion of the hub member, each of said baulking rings being provided with laterally-extending arms and the ends of said arms being forked in a radial direction to jointly provide in effect an external annular groove to receive the spring-ring with radial clearance but with substantially no clearance in an axial direction, and said hub member being formed to receive said arms with clearance in a circumferential direction, and to receive said spring-ring with clearance both in a radial direction and in an axial direction.

4. A synchro-mesh change-speed gearing, according to claim 3, in which the lateral arms from each of the baulking rings are circumferentially spaced and grouped with those from the other baulking ring in pairs in slots, in the hub member, which provide the said circumferential clearance.

EDGAR DAVID FROST.

REFERENCES CITED

The following references are of record in the file of this patent:

UNITED STATES PATENTS

| Number | Name | Date |
|---|---|---|
| 1,967,065 | Rasmussen | July 17, 1934 |
| 2,101,134 | Fawick | Dec. 7, 1937 |
| 2,260,863 | Orr | Oct. 28, 1941 |
| 2,333,165 | Fishburn | Nov. 2, 1943 |
| 2,364,331 | White | Dec. 5, 1944 |
| 2,369,842 | Neracher | Feb. 20, 1945 |
| 2,369,861 | Schotz | Feb. 20, 1945 |

FOREIGN PATENTS

| Number | Country | Date |
|---|---|---|
| 403,319 | Great Britain | Dec. 21, 1933 |

OTHER REFERENCES

Ser. No. 352,808, Guter et al. (A. P. C.), pub. May 18, 1943.